United States Patent
Wagner et al.

(10) Patent No.: US 10,336,368 B2
(45) Date of Patent: Jul. 2, 2019

(54) REAR CARRIAGE STEERING MECHANISM AND METHOD

(71) Applicant: Hübner GmbH & Co. KG, Kassel (DE)

(72) Inventors: Sebastian Wagner, Dresden (DE); Gunter Nitzsche, Leipzig (DE)

(73) Assignee: Hübner GmbH & Co. KG, Kassel (DE)

( * ) Notice: Subject to any disclaimer, the term of this patent is extended or adjusted under 35 U.S.C. 154(b) by 196 days.

(21) Appl. No.: 15/462,191

(22) Filed: Mar. 17, 2017

(65) Prior Publication Data

US 2017/0267283 A1 Sep. 21, 2017

(30) Foreign Application Priority Data

Mar. 18, 2016 (EP) ..................................... 16161086
Apr. 28, 2016 (EP) ..................................... 16167498

(51) Int. Cl.
*B62D 12/02* (2006.01)
*B62D 6/00* (2006.01)
*B62D 13/00* (2006.01)

(52) U.S. Cl.
CPC ............. *B62D 12/02* (2013.01); *B62D 6/002* (2013.01); *B62D 13/00* (2013.01)

(58) Field of Classification Search
CPC ......... B62D 12/02; B62D 6/002; B62D 13/00
See application file for complete search history.

(56) References Cited

U.S. PATENT DOCUMENTS

| | | | | |
|---|---|---|---|---|
| 4,106,792 A | * | 8/1978 | Schultz | B60D 5/00 280/432 |
| 4,344,640 A | | 8/1982 | Ratsko et al. | |
| 4,405,145 A | * | 9/1983 | Bergman | B62D 53/0871 180/14.2 |
| 4,982,976 A | * | 1/1991 | Kramer | B62D 13/005 280/426 |
| 5,090,719 A | * | 2/1992 | Hanaoka | B62D 13/04 280/408 |
| 5,348,331 A | * | 9/1994 | Hawkins | B60D 1/322 280/455.1 |

(Continued)

FOREIGN PATENT DOCUMENTS

DE 3923680 A1 1/1991
DE 102009017831 10/2010
(Continued)

OTHER PUBLICATIONS

English translation Abstract of EP1531117.
Machine English translation of DE-102009017831.

*Primary Examiner* — Joseph M Rocca
*Assistant Examiner* — Michael R Stabley
(74) *Attorney, Agent, or Firm* — Dinsmore & Shohl LLP

(57) ABSTRACT

A method of adjusting a steering mechanism of a front axle of a rear carriage of a multi-part wheeled articulated vehicle includes the step of adjusting the steering mechanism to a setting corresponding to a target value of the steering deflection angle of the wheels of the front axle of the at least one rear carriage and modifying the steering deflection angle such that forces and/or moments and resulting displacements and/or torsions and/or tensions acting on the front and/or rear carriages are minimized.

22 Claims, 3 Drawing Sheets

(56) References Cited

U.S. PATENT DOCUMENTS

| | | | | |
|---|---|---|---|---|
| 5,364,116 A * | 11/1994 | Houle | ............... | B62D 13/025 |
| | | | | 280/426 |
| 5,558,350 A * | 9/1996 | Kimbrough | ............ | B60D 1/06 |
| | | | | 280/426 |
| 7,694,993 B2 * | 4/2010 | Timmons, Jr. | ......... | B62D 13/06 |
| | | | | 280/442 |
| 8,955,865 B2 * | 2/2015 | Fortin | ............... | B62D 13/00 |
| | | | | 280/442 |
| 9,051,007 B2 * | 6/2015 | Orgeron | ............ | B62D 13/00 |
| 2007/0194557 A1 | 8/2007 | Caporali et al. | | |
| 2008/0224444 A1 * | 9/2008 | Atley | ............... | B62D 1/28 |
| | | | | 280/442 |
| 2009/0032273 A1 * | 2/2009 | Hahn | ............... | A01B 69/006 |
| | | | | 172/2 |

FOREIGN PATENT DOCUMENTS

| | | |
|---|---|---|
| EP | 1531117 | 5/2005 |
| RU | 2342258 C2 | 12/2008 |

\* cited by examiner

REAR CARRIAGE STEERING MECHANISM AND METHOD

REFERENCE TO RELATED APPLICATIONS

This application claims priority from EP Application No. 16161086.0, filed Mar. 18, 2016 and EP Application No. 16167498.1, filed Apr. 28, 2016, the entire content of both of which is incorporated herein by reference.

FIELD OF THE INVENTION

The invention relates to a steering mechanism of a rear carriage of a multi-part wheeled land vehicle, in particular of an articulated bus, wherein the rear carriage is articulately joined with the front carriage, as well as a land vehicle with such a steering mechanism and also a method for steering the rear carriage of a multi-part wheeled land vehicle, in particular of an articulated bus.

BACKGROUND OF THE INVENTION

Articulated buses in the form of multi-part wheeled land vehicles are sufficiently known from the prior art. In such a vehicle, the front carriage comprises two axles disposed in a spaced-apart relationship, wherein the rear carriage comprises an axle at its rear end, wherein the rear carriage is articulately joined with the front carriage. Between the front carriage and the rear carriage, there is provided a gangway, which allows persons to cross from one vehicle part into the other vehicle part.

The previously described articulated buses are divided into pulling vehicles and pushing vehicles. In pushing vehicles, the last axle of the front carriage is usually driven, whereas in pulling vehicles, the axle of the rear carriage is driven.

In order to increase the transport capacity of such articulated buses, there are plans for producing not only two part vehicles, such as known from the prior art, but to assemble three or more vehicle parts to form an articulated bus. There are also plans to increase the transport capacity of two part vehicles by providing a longer rear carriage with two or more axles. It is also conceivable to combine such multi-axle trailers as rear carriages to form entire articulated bus trains.

In the case of a two-axle rear vehicle of a multi-part wheeled land vehicle, it is necessary to design the wheels of the front axle so that they are steerable, in order to allow the rear carriage to follow the front carriage along the curve of a bend. In this respect, the steering deflection angle of the wheels of the front axle of the rear carriage is customarily prescribed by the steering deflection angle of at least one steerable axle of the front carriage and/or the angle between the front carriage and the rear carriage and/or the steering angle of the rear axle of the rear carriage. The steering deflection angle that is prescribed to the steerable axle of the rear carriage by the front carriage is theoretically calculated such that the two vehicle parts, i.e. the front carriage and the rear carriage, are not subjected to any transverse forces. This means that in an ideal case, the land vehicle should not be subjected to any forces that would lead for example to tensions on the chassis or to a transverse displacement of the rear carriage on the ground when driving around a bend, which increases tire wear or can damage the road.

SUMMARY OF THE INVENTION

However, in reality it has turned out that the vehicle is in fact subjected to transverse forces, which can lead to corresponding displacements or moments in the area of the articulated joint between the two vehicle parts, i.e. between the front carriage and the rear carriage. This is the case, for example, when the actual steering deflection angle of the wheels of the front axle of the rear carriage deviates from the target value that is prescribed by the front carriage. The consequence thereof can be a lateral displacement of the vehicle parts on a corresponding ground surface. Due to the high rigidity of the tires and the vehicle body, even small angle errors lead to great transverse forces and tensions.

A discrepancy between the actual steering deflection angle of the rear carriage and the target value prescribed by the steerable axle of the front carriage can be caused by various influencing factors. For example, the Ackermann steering system can feature certain tolerances, e.g. due to wear, which still fall within the normal range. Furthermore, it is not always possible to ensure that the axles of the vehicles are absolutely precisely disposed at the provided points on the chassis. Inaccuracies also result from tolerances in the measuring sensor system, at least when detecting the steering deflection angle of the steerable axle of the front carriage. This means that manufacturing tolerances, wear and measurement and adjustment inaccuracies, as well as inaccuracies of the calculation model used, together lead to inaccuracies with regard to the steering deflection angle of the wheels of the front axle of the rear carriage. In addition, this means for example that in a case in which the calculated steering deflection angle is actually applied to the wheels of the steerable axle of the rear carriage, the chassis of the vehicles would not be subjected to any force other than thrust and traction forces caused by the drive and the brakes when turning around a bend, which means that the actual steering deflection angle of the rear carriage would then be correlated with the steering deflection angle of the front carriage. However, the sum of the previously mentioned inaccuracies can lead to a different deviating actual steering deflection angle of the rear carriage. In this respect, DE102009017831 provides for a determination of a correction angle in a towing vehicle for agricultural or forestry uses, with multiple steering axles, with a trailer or semi-trailer, which is provided with at least one positively steered axle. Here, the determination is based on the assumption that in the case of a towing vehicle, in which the front axle and the rear axle are designed to be steerable, not only the front axle, but also the steering deflection angle of the steerable rear axle of the towing vehicle, and, if applicable, the bend angle between the front and rear carriages should be used for determining the steering deflection angle of the steerable axle of the rear carriage. Both steering deflection angles and, if applicable, the bend angle between the vehicles are factored in together and thus provide the steering deflection angle for the steerable front axle of the rear carriage. Thus a steering angle, which allows steering the tractor/trailer unit, in particular the trailer, in a manner that preserves both the ground and the material, is provided to the control system of the trailer for steering the trailer. However, this approach does not take into account any deviation of the actual steering deflection angle of the front axle of the rear carriage from a value prescribed by the steerable axle of the front carriage, when e.g. manufacturing tolerances are to be considered.

Therefore, the problem underlying the invention is to provide a steering mechanism, which, when used, avoids tensions in the vehicle parts, i.e. the front carriage and/or the rear carriage and/or a misalignment of the multi-part wheeled land vehicle.

The object of the invention is the steering mechanism of a rear carriage of a multi-part wheeled land vehicle, in particular of an articulated bus, wherein the rear carriage is articulately joined with the front carriage. In this respect, the rear carriage comprises at least two axles, wherein at least the wheels of the front axle are designed to be steerable in particular by way of an Ackermann steering system. The axles are advantageously disposed in a spaced-apart relationship, meaning that the rear carriage is advantageously not a tandem axle carriage. When the land vehicle comprising a front carriage and at least one rear carriage drives around a bend and forces and/or moments act on the front and/or rear carriages and resulting displacements and/or torsions and/or tensions—in the following also referred to as variables—act on the vehicle parts, these forces and/or moments and the resulting variables can by minimised by modifying the steering deflection angle of the steerable wheels of the front axle of the rear carriage. This means that the steering deflection angle of the steerable wheels of the front axle of the rear carriage is corrected until the forces and/or moments induced by the misalignment of the actual steering deflection angle initially provided by the steering mechanism and acting on the vehicle parts are minimized.

According to one embodiment of the invention, when the vehicle drives around a bend, the steering deflection angle of the wheels of the front axle of the rear carriage is provided to the steering mechanism as a value calculated based on the steering deflection angle of the wheels of at least one steerable axle of the front carriage, wherein in case of a deviation of the actual angular position of the wheels of the front axle of the rear carriage from the optimal value, the forces and/or moments acting on the front and/or rear carriage and the resulting displacements, torsions and/or tensions can be used by the steering mechanism for minimization through a modification of the angular position of the wheels of the front axle of the rear carriage. A steerable axle refers to an axle that allows moving, or rather adjusting the wheels of the axle by a specific angle.

A second embodiment of the invention is characterized in that when driving around a bend the steering deflection angle of the wheels of the front axle of the rear carriage is provided to the steering mechanism as a value calculated based on the angle between the longitudinal axis of the front carriage and that of the rear carriage, i.e. the bend angle between the two vehicles, wherein, in case of a deviation of the actual angular position of the wheels of the front axle of the rear carriage from the optimal value, the forces and/or moments acting on the front and/or rear carriage and the resulting variables can be used by the steering mechanism for minimization through a modification of the steering deflection angle of the front axle of the rear carriage. In the process, the actual angular position of the front axle of the rear carriage can correspond to the calculated value, but it can also deviate from it, precisely because of the deflected steering knuckles.

In this respect, the optimal value is a value at which, apart from the forces and moments usually generated by driving and braking, the vehicle or the vehicle parts including the articulated joint are not subjected to any other additional forces and/or moments and resulting displacements, torsions and/or tensions, which consequently prevents the wheels from grinding against the ground, for example when the tensions in the vehicle parts become too great.

Thus, the difference between the first and the second embodiment consists in that in the first embodiment the steering deflection angle of the steerable axle of the rear carriage is prescribed by the steering deflection angle of at least one steerable axle of the front carriage, whereas in the second embodiment the angular position of the two vehicle parts relative to each other is used for calculating the value for steering the steerable axle of the rear carriage. It is also conceivable to consider a combination of at least one steering deflection angle of the steerable axles of the front carriage and of the angular position of the vehicles relative to each other.

If the wheels of a rear axle of a rear carriage are steerable, their steering angle can also be taken into account for determining the steering angle of the wheels of the front axle of the rear carriage.

Advantageously, the steering mechanism can comprise a computer unit, in which the calculated values of the steering deflection angle of the wheels of at least one steerable axle of the front carriage, of the angular positions of the front carriage and the rear carriage and/or of the steering deflection angle of the wheels of a rear axle of the rear carriage can be used for calculating a correction value, wherein the correction value is provided to the steering mechanism of the front axle of the rear carriage, wherein in case of a deviation of the angular position of the wheels of the front axle of the rear carriage, which has been set based on this correction value, from the technically optimal value, the forces and/or moments and resulting variables, such as displacements, torsions and/or tensions can be used by the steering mechanism for minimization by modifying the steering deflection angle of the front axle of the rear carriage.

According to another feature of the invention, it is provided that sensors are used for determining the forces and/or moments and the resulting displacements, torsions and/or tensions on the vehicle parts. For example, it can be provided that strain gauges are used for determining the forces and moments. Displacements, torsions or tensions can be determined, for example, using position or angle sensors. This shows that the forces and moments on the one hand or displacements, torsions or tensions on the other hand can be determined respectively separately, depending on which ones are easier to determine.

According to an advantageous feature, it is further provided that two vehicle parts of a multi-part wheeled land vehicle are joined with each other by a vehicle joint. Such a vehicle joint, which comprises more specifically two joint segments that are pivotably connected with each other and are disposed at their respective ends on the chassis of the front or rear carriage, has at least one metal rubber bearing as a coupling element for connection with the at least one vehicle part. This means that the front and rear carriage can be connected by way of metal rubber bearings with the respective joint segment of the joint. The structure of such metal rubber bearings for connecting the joint segments with the chassis of the front or rear carriage is known. According to one feature of the invention, at least one sensor is advantageously disposed in the area of the metal rubber bearing for determining a force and/or a moment, respectively the resulting variables such as displacements, torsions and/or tensions, in order to then minimize these forces and/or moments and the resulting variables by modifying the steering deflection angle of the wheels of the front axle of the rear carriage, as has been described above.

As has already been explained, the vehicle joint comprises two joint segments that are pivotable relative to each other, wherein the vehicle joint comprises a measuring device for determining the angular position of the two joint segments relative to each other. This means that with such a measuring device, for example a so-called rotary encoder, the position of the vehicles relative to each other, with respect to their respective imaginary centre longitudinal axes, can be determined and this angle can serve to determine the steering deflection angle of the steerable wheels of the axle of the rear carriage. Such a steering mechanism can be used both in pulling and pushing vehicles.

Another object of the invention is a multi-part wheeled land vehicle comprising a control or regulation system for a steering mechanism according to one of the claims 1 to 7.

Another object of the invention is a method for steering the rear carriage of a multi-part wheeled land vehicle, in particular of an articulated bus, wherein the rear carriage is joined with the front carriage, wherein the rear carriage comprises at least two spaced-apart axles, wherein the front carriage comprises at least one axle with steerable wheels, wherein at least the wheels of the front axle of the rear carriage are designed to be steerable, wherein the method comprises the following steps:

calculating the steering deflection angle of the wheels of the front axle of the rear carriage based on the angle between the front carriage and the rear carriage and/or on the angular position of the wheels of at least one steerable axle of the front carriage and/or on the angular position of the wheels of a rear axle of the rear carriage;

adjusting the steering deflection angle of the wheels of the front axle of the rear carriage based on the calculated steering deflection angle;

detecting the forces and/or moments and the resulting displacements, torsions and/or tensions acting on the front and/or rear carriage;

approximately minimizing the forces and/or moments and/or displacements and/or torsions and/or tensions by modifying the steering deflection angle of the wheels of the front axle of the rear vehicle.

In doing so, it is provided that when the wheels of several axles on the front carriage are being steered, at least the steering angle of the wheels of two axles can be used for determining the steering angle of the wheels of the front axle of the rear carriage.

BRIEF DESCRIPTION OF THE DRAWINGS

FIG. 2 shows a vehicle joint with a front and rear carriage, which are merely hinted at.

DETAILED DESCRIPTION OF THE INVENTION

Figure 1:
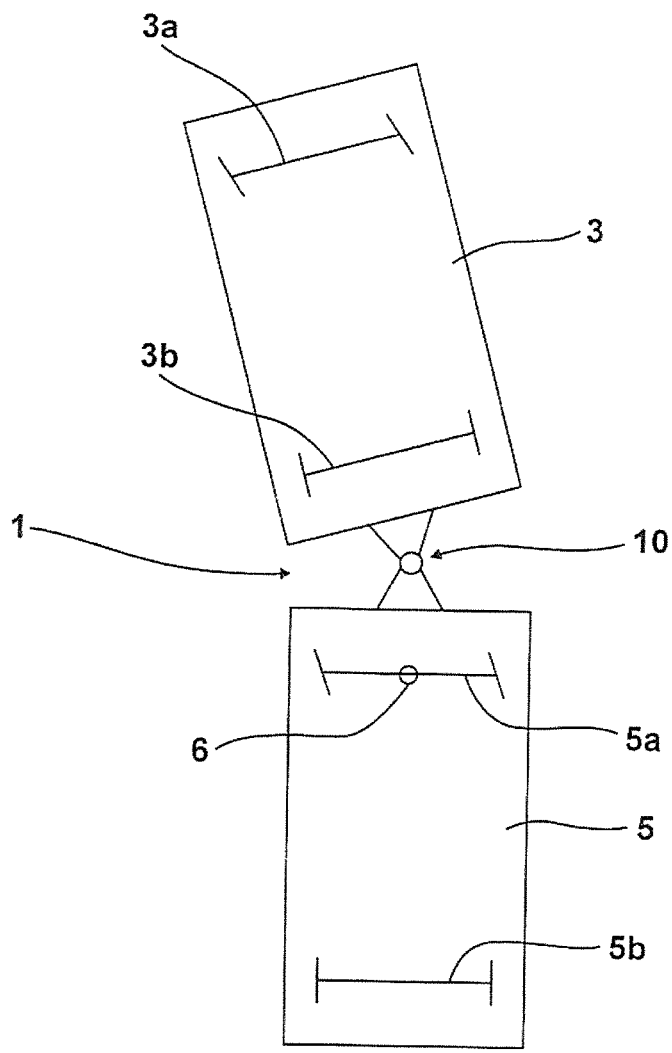
FIG. 1 schematically shows an articulated vehicle.

According to FIG. 1, the articulated vehicle labelled 1 comprises the front carriage 3 and the rear carriage 5. The front and rear carriage 3, 5 are joined by the vehicle joint labelled 10. Both the front carriage 3 and the rear carriage 5 respectively comprise two axles 3a, 3b, respectively 5a, 5b. The wheels of the front axle 3a of the front carriage 3 are designed to be steerable, which also applies to the wheels of the front axle 5a of the rear carriage 5. The steering mechanism of the front axle 5a of the rear carriage 5 comprises an Ackermann-steering system and is labelled 6. The wheels of the rear axle of the rear carriage 5 can also be designed to be steerable.

Figure 2:
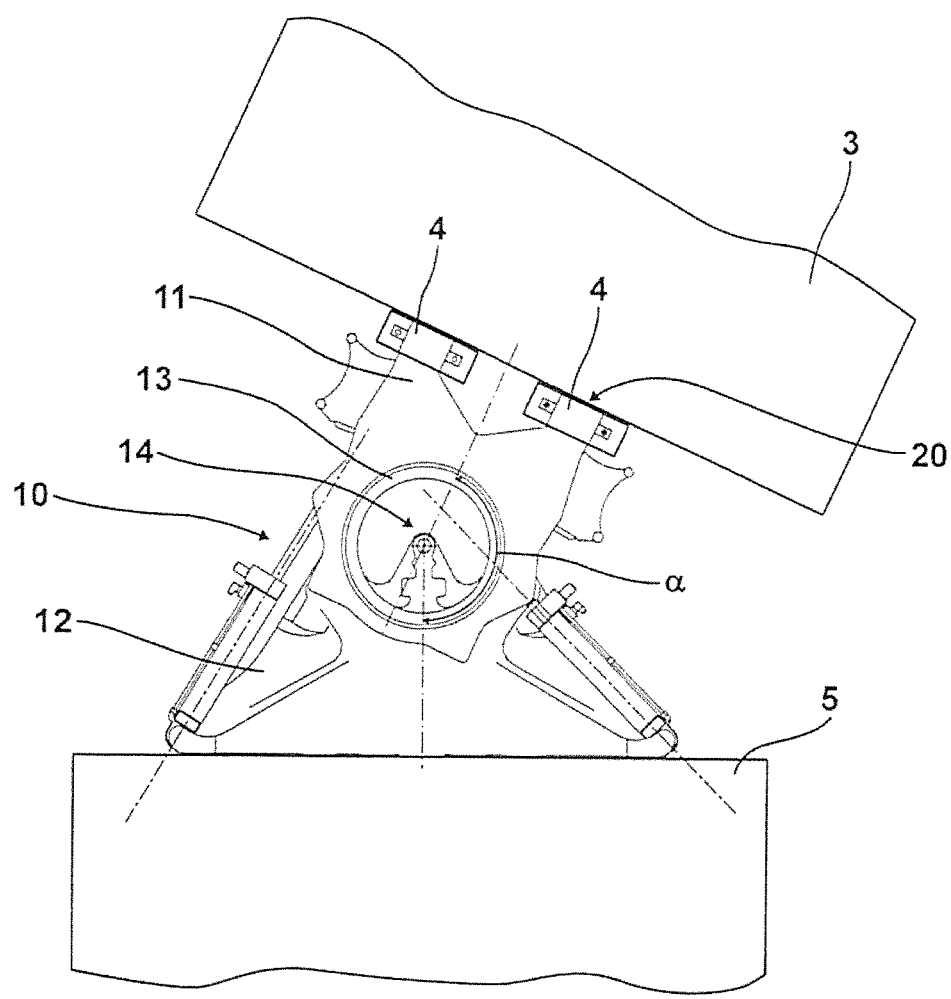

FIG. 2 shows the embodiment of the vehicle joint 10. The vehicle joint 10 comprises two joint segments 11, 12, which are pivotably connected to each other by a pivot bearing 13. A so-called rotary encoder 14, by means of which the angular position of the two joint segments 11, 12 relative to each other and thus the position of the front carriage relative to the rear carriage can be determined, is disposed in the pivot bearing 13. In FIG. 2, the rotation angle is labelled α.

Figure 3:
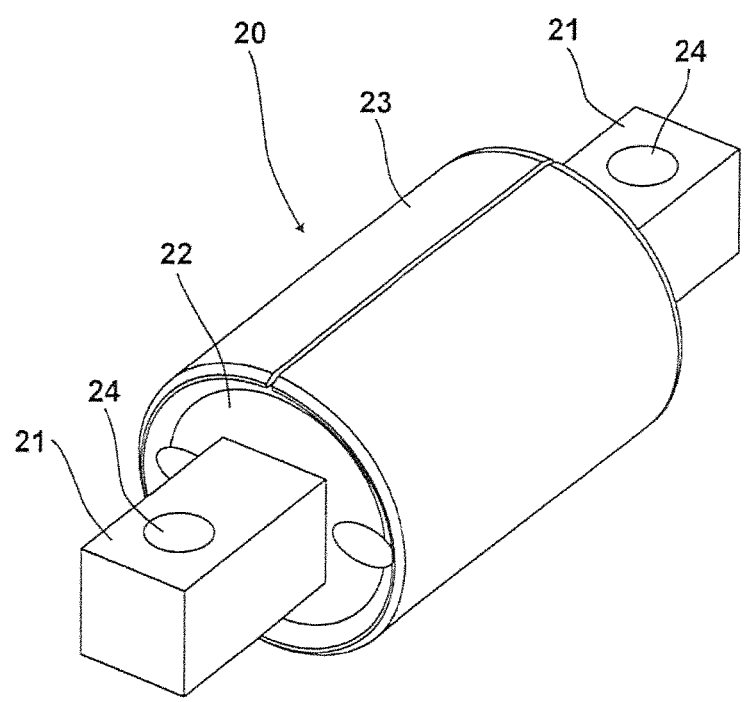
FIG. 3 shows a metal rubber bearing.

The connection of the vehicle joint 10 to the front carriage 3 is carried out by way of two metal rubber bearings 20. The configuration of the two metal rubber bearings can be seen in FIG. 3. Such a metal rubber bearing comprises an axle journal 21, which is mounted under pre-tension on an elastomer pad 22 in a metal sleeve, which forms a housing 23. Such metal rubber bearings are sufficiently known from the prior art. The metal rubber bearing 20 with the housing 23 are received in a corresponding borehole in the joint segment 11. At its ends protruding from the housing 23, the axle journal 21 comprises respectively one borehole 24, which serves to receive respectively one screw for connecting it to a bearing block 4 disposed on the chassis of the front carriage 3. In the area of the metal rubber bearing, and here in particular in the metal rubber bearing itself, sensors (not shown) can be disposed, which serve to detect forces, moments, displacements, torsions and/or tensions. For example, theses sensors can be load cells, strain gauges or position or angle sensors.

LIST OF REFERENCE NUMBERS

1 Articulated vehicle
3 Front carriage
3a Front axle
3b Rear axle
4 Bearing block
5 Rear carriage
5a Front axle
5b Rear axle
6 Steering mechanism (Ackermann-steering mechanism)
10 Vehicle joint
11 Joint segment
12 Joint segment
13 Pivot bearing
14 Rotary encoder
20 Metal rubber bearing
21 Axle journal
22 Elastomer pad
23 Housing
24 Borehole

The invention claimed is:

1. A method of adjusting a steering mechanism of a front axle of a rear carriage of a multi-part wheeled articulated vehicle, comprising the steps of:

providing a multi-part wheeled articulated vehicle having a front carriage and at least one rear carriage articulately joined with the front carriage, the at least one rear carriage having at least a front axle and a rear axle, each having wheels, at least the wheels of the front axle of the at least one rear carriage being steerable, the front carriage including at least one steerable axle having wheels;

providing a steering mechanism for the front axle of the at least one rear carriage, the steering mechanism operable to adjust a steering deflection angle of the wheels of the front axle of the rear carriage;

adjusting the steering mechanism to adjust the steering deflection angle of the wheels of the front axle of the at least one rear carriage when the vehicle drives around a bend such that the respective rear carriage follows the front carriage, the adjusting step comprising adjusting the steering mechanism to a setting corresponding to a target value of the steering deflection angle of the wheels of the front axle of the at least one rear carriage;

calculating the target value of the steering deflection angle of the wheels of the front axle of the at least one rear carriage based on a steering deflection angle of the wheels of the at least one steerable axle of the front carriage; and modifying the steering deflection angle of the wheels of the front axle of the at least one rear carriage when the vehicle drives around a bend such that forces or moments and resulting displacements, torsions, or tensions acting on the front or rear carriages are minimized.

2. A method in accordance with claim 1, wherein the wheels of the rear axle of the at least one rear carriage are steerable, the calculating step further comprising calculating the target value based a steering deflection angle of the wheels of the rear axle of the at least one rear carriage.

3. A method in accordance with claim 1, further comprising calculating the target value of the steering deflection angle of the wheels of the front axle of the at least one rear carriage based on an angle between a longitudinal axis of the front carriage and a longitudinal axis of the at least one rear carriage.

4. A method in accordance with claim 3, wherein the wheels of the rear axle of the at least one rear carriage are steerable, the calculating step further comprising calculating the target value based a steering deflection angle of the wheels of the rear axle of the at least one rear carriage.

5. A method in accordance with claim 1, wherein the steering mechanism comprises a computer unit.

6. A method in accordance with claim 1, further comprising sensors adapted to determine the forces, moments, displacements, torsions or tensions.

7. A method in accordance with claim 1, wherein the front carriage and at least one rear carriage of the multi-part wheeled articulated vehicle are joined with each other by a vehicle joint.

8. A method in accordance with claim 7, wherein the vehicle joint is connected to the front and/or at least one rear rear carriage by metal rubber bearings, further comprising at least one sensor adapted to detect the forces or moments and the resulting displacements, torsions or tensions is disposed in the area of one of the metal rubber bearings.

9. A method in accordance with claim 7, wherein the vehicle joint includes two joint segments that are pivotably connected with each other and a measuring device for determining the angular position of the vehicle segments relative to each other.

10. A multi-part wheeled land vehicle, comprising a control or regulation system for a steering mechanism according to claim 1.

11. A steering mechanism of a rear carriage of a multi-part wheeled articulated land vehicle, wherein the rear carriage is articulately joined with a front carriage, wherein the rear carriage comprises at least two axles, wherein at least the wheels of the front axle are designed to be steerable, wherein when the land vehicle drives around a bend, the forces or moments and resulting displacements, torsions or tensions acting on the front or rear carriages are minimised by modifying the steering deflection angle of the wheels of the front axle of the rear carriage, and when driving around the bend, the steering deflection angle of the wheels of the front axle of the rear carriage is provided to the steering mechanism of the front axle of the rear carriage as a value calculated based on the steering deflection angle of the wheels of at least one steerable axle of the front carriage, wherein in case of a deviation of the actual angular position of the wheels of the front axle of the rear carriage from an optimal value, the forces or moments and the resulting displacements, torsions or tensions acting on the front or rear carriage can be used by the steering mechanism for minimization through a modification of the angular position of the wheels of the front axle of the rear carriage.

12. The steering mechanism according to claim 11, characterized in that when driving around a bend, the steering deflection angle of the wheels of the front axle of the rear carriage is provided to the steering mechanism as a value calculated based on the angle between the longitudinal axis of the front carriage and that of the rear carriage, wherein, in case of a deviation of the actual angular position of the wheels of the front axle of the rear carriage from the optimal value, the forces or moments and the resulting displacements, torsions or tensions acting on the front or rear carriage can be used by the steering mechanism for minimization through a modification of the steering deflection angle of the front axle of the rear carriage.

13. The steering mechanism according to claim 11, characterized in that when driving around a bend, the steering deflection angle of the wheels of the front axle of the rear carriage is provided to the steering mechanism of the front axle of the rear carriage as a value calculated based on the steering deflection angle of the wheels of a rear axle of the rear carriage, wherein, in case of a deviation of the actual angular position of the wheels of the front axle of the rear carriage from the optimal value, the forces or moments and the resulting displacements, torsions or tensions acting on the front or rear carriage can be used by the steering mechanism for minimization through a modification of the steering deflection angle of the front axle of the rear carriage.

14. The steering mechanism according to claim 11, characterized in that the steering mechanism comprises a computer unit, in which the calculated values of the steering deflection angle of the wheels of at least one steerable axle of the front carriage, or of the angular positions of the front carriage and the rear carriage or of the steering deflection angle of the wheels of a rear axle of the rear carriage can be used for calculating a correction value, wherein the correction value is provided to the steering mechanism of the front axle of the rear carriage, wherein in case of a deviation of the angular position of the wheels of the front axle of the rear carriage, which has been set based on this correction value, from an optimal correction value, the forces or moments and resulting displacements, torsions or tensions acting on the front or rear carriages can be used by the steering mechanism for minimization by modifying the steering deflection angle of the front axle of the rear carriage.

15. The steering mechanism according to claim 11, characterized in that sensors are used for determining the forces, moments, displacements, torsions or tensions.

16. The steering mechanism according to claim 11, characterized in that the front and rear carriages of a multi-part wheeled articulated vehicle are joined with each other by a vehicle joint.

17. The steering mechanism according to claim 16, characterized in that the vehicle joint is connected to the front or rear carriage by metal rubber bearings, wherein at least one sensor for detecting the forces or moments and the resulting displacements, torsions or tensions is disposed in the area of the metal rubber bearing.

18. The steering mechanism according to claim 16, characterized in that the vehicle joint comprises two joint segments that are pivotably connected with each other, wherein the vehicle joint comprises a measuring device for determining the angular position of the vehicle segments relative to each other.

19. A method for steering a rear carriage of a multi-part wheeled articulated land vehicle, wherein the rear carriage is joined with a front carriage, wherein the rear carriage comprises at least two axles, wherein the front carriage comprises at least one axle with steerable wheels, wherein at least the wheels of the front axle of the rear carriage are designed to be steerable, wherein the method comprises the following steps:
calculating the steering deflection angle of the wheels of the front axle of the rear carriage based on the angle between the front and the rear carriage or on the angular position of the wheels of at least one steerable axle of the front carriage or on the angular position of the wheels of a rear axle of the rear carriage;
adjusting the steering deflection angle of the wheels of the front axle of the rear carriage based on the calculated steering deflection angle;
detecting the forces or moments and the resulting displacements, torsions, or tensions acting on the front or rear carriage; and
minimizing the forces, moments, displacements, torsions, or tensions by modifying the steering deflection angle of the wheels of the front axle of the rear vehicle.

20. A method of adjusting a steering mechanism of a front axle of a rear carriage of a multi-part wheeled articulated vehicle, comprising the steps of:
providing a multi-part wheeled articulated vehicle having a front carriage and at least one rear carriage articulately joined with the front carriage, the at least one rear carriage having at least a front axle and a rear axle, each having wheels, at least the wheels of the front axle of the at least one rear carriage being steerable, the front carriage including at least one steerable axle having wheels;
providing a steering mechanism for the front axle of the at least one rear carriage, the steering mechanism operable to adjust a steering deflection angle of the wheels of the front axle of the rear carriage;
adjusting the steering mechanism to adjust the steering deflection angle of the wheels of the front axle of the at least one rear carriage when the vehicle drives around a bend such that the respective rear carriage follows the front carriage, the adjusting step comprising adjusting the steering mechanism to a setting corresponding to a target value of the steering deflection angle of the wheels of the front axle of the at least one rear carriage;
calculating the target value of the steering deflection angle of the wheels of the front axle of the at least one rear carriage based on an angle between a longitudinal axis of the front carriage and a longitudinal axis of the at least one rear carriage; and
modifying the steering deflection angle of the wheels of the front axle of the at least one rear carriage when the vehicle drives around a bend such that forces or moments and resulting displacements, torsions, or tensions acting on the front or rear carriages are minimized.

21. A steering mechanism of a rear carriage of a multi-part wheeled articulated land vehicle,
wherein the rear carriage is articulately joined with a front carriage, wherein the rear carriage comprises at least two axles,
wherein at least the wheels of the front axle are designed to be steerable,
wherein when the land vehicle drives around a bend, the forces or moments and resulting displacements, torsions or tensions acting on the front or rear carriages are minimized by modifying the steering deflection angle of the wheels of the front axle of the rear carriage, and
when driving around the bend, the steering deflection angle of the wheels of the front axle of the rear carriage is provided to the steering mechanism as a value calculated based on the angle between the longitudinal axis of the front carriage and that of the rear carriage, wherein, in case of a deviation of the actual angular position of the wheels of the front axle of the rear carriage from the optimal value, the forces or moments and the resulting displacements, torsions or tensions acting on the front or rear carriage can be used by the steering mechanism for minimization through a modification of the steering deflection angle of the front axle of the rear carriage.

22. A steering mechanism of a rear carriage of a multi-part wheeled articulated land vehicle,
wherein the rear carriage is articulately joined with a front carriage, wherein the rear carriage comprises at least two axles,
wherein at least the wheels of the front axle are designed to be steerable,
wherein when the land vehicle drives around a bend, the forces or moments and resulting displacements, torsions or tensions acting on the front or rear carriages are minimized by modifying the steering deflection angle of the wheels of the front axle of the rear carriage, and
when driving around the bend, the steering deflection angle of the wheels of the front axle of the rear carriage is provided to the steering mechanism of the front axle of the rear carriage as a value calculated based on the steering deflection angle of the wheels of a rear axle of the rear carriage, wherein, in case of a deviation of the actual angular position of the wheels of the front axle of the rear carriage from the optimal value, the forces or moments and the resulting displacements, torsions or tensions acting on the front or rear carriage can be used by the steering mechanism for minimization through a modification of the steering deflection angle of the front axle of the rear carriage.

* * * * *